United States Patent
Haggenmüller et al.

(10) Patent No.: US 9,946,626 B2
(45) Date of Patent: Apr. 17, 2018

(54) METHOD AND SYSTEM FOR MEASURING A RUNTIME BY MEANS OF WATCHPOINTS

(71) Applicant: 3S-Smart Software Solutions GmbH, Kempten (DE)

(72) Inventors: Wolfgang Haggenmüller, Ottobeuren (DE); Dieter Hess, Lauben (DE); Bernhard Werner, Kempten (DE)

(73) Assignee: CODESYS Holding GmbH, Kempten (DE)

( * ) Notice: Subject to any disclaimer, the term of this patent is extended or adjusted under 35 U.S.C. 154(b) by 0 days.

(21) Appl. No.: 15/136,564

(22) Filed: Apr. 22, 2016

(65) Prior Publication Data
US 2016/0314058 A1    Oct. 27, 2016

(30) Foreign Application Priority Data
Apr. 23, 2015 (EP) .................................... 15164855

(51) Int. Cl.
*G06F 9/44* (2006.01)
*G06F 11/36* (2006.01)
*G06F 11/30* (2006.01)
*G06F 11/34* (2006.01)

(52) U.S. Cl.
CPC ........ *G06F 11/3612* (2013.01); *G06F 11/302* (2013.01); *G06F 11/3495* (2013.01)

(58) Field of Classification Search
None
See application file for complete search history.

(56) References Cited

U.S. PATENT DOCUMENTS

| | | | | |
|---|---|---|---|---|
| 7,827,510 B1 * | 11/2010 | Schubert | ............. | G06F 17/5027 716/111 |
| 7,890,941 B1 | 2/2011 | Garud et al. | | |
| 8,910,124 B1 | 12/2014 | Bhansali et al. | | |
| 2001/0047510 A1 | 11/2001 | Angel et al. | | |
| 2006/0047681 A1 * | 3/2006 | Ghiya | ....................... | G06F 8/433 |
| 2007/0168968 A1 * | 7/2007 | Bates | .................... | G06F 11/3636 717/124 |
| 2008/0127035 A1 * | 5/2008 | Lev | ........................ | G06F 11/362 717/100 |
| 2008/0244533 A1 * | 10/2008 | Berg | .................... | G06F 11/3447 717/128 |

(Continued)

FOREIGN PATENT DOCUMENTS

WO    2007104956 A2    9/2007

OTHER PUBLICATIONS

Extended European Search Report dated Oct. 8, 2015 issued in European Application No. 15 164 855.7.

*Primary Examiner* — Chameli Das
(74) *Attorney, Agent, or Firm* — Grossman, Tucker, Perreault & Pfleger, PLLC (57) ABSTRACT

A runtime of a computer program may be measured by providing the compiled computer program with at least a first watchpoint and a second watchpoint at respective first and second code locations, running the compiled computer program on a computing device, measuring a first time parameter at the first watchpoint and a second time parameter at the second watchpoint, and determining the runtime of at least part of the compiled computer program in terms of the second time parameter and the first time parameter.

15 Claims, 6 Drawing Sheets

(56) References Cited

U.S. PATENT DOCUMENTS

| | | | |
|---|---|---|---|
| 2008/0276129 A1* | 11/2008 | Cocker | G06F 11/3471 |
| | | | 714/45 |
| 2009/0125465 A1* | 5/2009 | Berg | G06F 11/3616 |
| | | | 706/17 |
| 2011/0035733 A1* | 2/2011 | Horning | G06F 21/14 |
| | | | 717/140 |
| 2011/0078666 A1* | 3/2011 | Altekar | G06F 11/3636 |
| | | | 717/131 |
| 2012/0144162 A1* | 6/2012 | Papakipos | G06F 8/20 |
| | | | 712/200 |
| 2013/0232475 A1* | 9/2013 | Chamieh | G06F 9/4428 |
| | | | 717/140 |
| 2014/0068569 A1 | 3/2014 | Goldin et al. | |
| 2014/0351650 A1* | 11/2014 | Elias | G06F 11/362 |
| | | | 714/38.1 |
| 2015/0067658 A1* | 3/2015 | Hahnenberg | G06F 12/0815 |
| | | | 717/148 |
| 2015/0121127 A1* | 4/2015 | Jain | G06F 11/1402 |
| | | | 714/6.11 |
| 2016/0147649 A1* | 5/2016 | Magdon-Ismail | G06F 12/0238 |
| | | | 711/118 |
| 2016/0210212 A1* | 7/2016 | Yim | G06F 9/522 |

* cited by examiner

METHOD AND SYSTEM FOR MEASURING A RUNTIME BY MEANS OF WATCHPOINTS

FIELD OF THE INVENTION

The invention relates to methods and systems for measuring a runtime of a computer program, in particular a compiled computer program used to control a programmable logic controller for machine automation applications.

BACKGROUND

Automation and versatile programmability of machinery, such as manufacturing machinery, is a crucial component in modern-day fabrication. Programmable logic controllers are often used to control the operation of the machinery, and may typically run an industrial control program that was written and compiled on an external programming environment. Their free programmability provides the flexibility to adapt the machinery in accordance with the given manufacturing task. However, in order to make efficient use of the machinery, it is desirable to carefully monitor the runtime of the computer program and its subroutines as they are executed on the programmable logic controller, preferably in real time and in the real industrial control environment.

Measurements of the runtime of a computer program are generally familiar from various fields of technology, and are sometimes known as profiling techniques. One skilled in the art is aware of two different kinds of profiling techniques:

In a statistical profiling, the program run is interrupted at specific pre-determined points in time, and the current call stack is determined. If repeated sufficiently often, this technique allows a statistical analysis of the runtime associated with specific functions of the program. Advantageously, statistical profiling may be employed without modifying the program code. However, these techniques do not allow a tailored and interactive profiling of specific functions.

An alternative profiling technique is code instrumentation. In this case, each function is provided with additional code so as to allow to measure the runtime of that function. The code instrumentation allows for a careful and tailored analysis of all the functions in the program. However, the additional code and profiling measurements need a large amount of memory space. Moreover, the additional code and time measurements slow down the execution of the program, which may be undesirable in an industrial control environment, or even impermissible due to safety constraints.

What is needed is a versatile and quick method and system for measuring a runtime in a compiled computer program, in particular for industrial control applications.

OVERVIEW OF THE INVENTION

These objectives are achieved with the method and system according to independent claims 1 and 10, respectively. The dependent claims relate to preferred embodiments.

A method for measuring a runtime in a compiled computer program comprises the steps of providing a compiled computer program with at least a first watchpoint and a second watchpoint at respective first and second code locations in said compiled computer program, running said compiled computer program on a computing device, measuring a first time parameter at said first watchpoint, measuring a second time parameter at said second watchpoint; and determining a runtime of at least a part of said compiled computer program in terms of said second time parameter and said first time parameter.

It is an idea underlying the present invention that the introduction of watchpoints into the compiled computer program allows for quick and versatile runtime measurements. The first watchpoint may trigger the measurement of the first time parameter, such as at the starting point or call of a function to be measured, and the second watchpoint may trigger the measurement of the second time parameter, such as at the end point or exit of said function to be measured. The runtime of part of said compiled computer program, such as said function, may then be measured in terms of said time parameters, for instance as a time difference between said second time parameter and said first time parameter.

In software development, a watchpoint may denote a specific kind of breakpoint. A breakpoint may be understood as an intentional stopping or pausing place in a program, which may be put in place for debugging purposes. A watchpoint may denote a breakpoint in which specific functions or actions may be called before the execution of the program is continued. For instance, such actions or functions may comprise the reading or storing of program variables, logging, or even the execution of additional program code external to the executed compiled computer program. Some techniques for implementing watchpoints will be described in further detail below.

In the context of the present invention, said first watchpoint may trigger the measurement of said first time parameter, and said second watchpoint may trigger the measurement of said second time parameter.

Said first watchpoint and said second watchpoint may be inserted at various different locations within the compiled computer program, which allows for a very flexible and versatile profiling.

In a preferred embodiment, said method comprises a step of inserting said first watchpoint and/or said second watchpoint into said compiled computer program at said first and second code locations.

Said method may further comprise a step of varying said first code location and/or varying said second code location.

In particular, said first code location and/or said second code location may be varied in accordance with or depending on a selected part of said compiled computer program for which a runtime shall be determined.

By inserting said first watchpoint and/or said second watchpoint into said compiled computer program at selected first and second code locations, respectively, a corresponding part of said compiled computer program between said first and second code locations may be selectively measured.

In particular, said first code location may be selected as a starting point of said selected part of said compiled computer program, such as a function, and said second code location may be selected as an end point of said selected part of said compiled computer program.

In general, a plurality of watchpoints may be inserted into said compiled computer program, and may be employed for determining corresponding runtimes of parts of said compiled computer program. The number of watchpoints to be inserted may be determined in accordance with the effect on the overall runtime of the system, and in accordance with the degree of slowdown of the computer program that may be acceptable in a given application or industrial control environment.

In general, said runtime may be determined in terms of a time difference between said second time parameter and said first time parameter.

In a preferred embodiment, said part of said compiled computer program is a function, and running said compiled computer program preferably comprises a step of calling or executing said function.

A function, in the sense of the present disclosure may denote a sequence or subset of instructions of said compiled computer program, such as a subroutine.

Said first code location may be associated with a call of a function as said compiled computer program is run on said computing device.

Said second code location may be associated with an exit from said function.

In an embodiment, said first watchpoint and/or said second watchpoint are patched into said compiled computer program.

In particular, said method may comprise a step of patching said first watchpoint and/or patching said second watchpoint into said compiled computer program.

Patching, in the sense of the present disclosure, can be understood as a manipulation of said compiled computer program code in which a portion of said compiled computer program code is replaced with a substitution code that performs a desired functionality, such as measuring a first time parameter or measuring a second time parameter.

Some platforms or processors may not support code manipulation such as patching. In this case, said first watchpoint and/or said second watchpoint may alternatively be implemented in hardware, such as on a processor unit of said computing device.

In particular, said first watchpoint and/or said second watchpoint may be implemented in terms of an exception that branches into a debugger routine.

A profiling by means of breakpoints is versatile and allows to measure the runtime of specific and isolated functions with minimum interference on the runtime of the entire program, which makes these techniques well-suited for applications in industrial control, where the effects of the profiling on the overall runtime need to be carefully checked and limited.

In a preferred embodiment, said compiled computer program is a control program for controlling a programmable logic controller unit.

Said computing device may be a programmable logic controller unit, or part of a programmable logic controller unit.

In a preferred embodiment, said part of said compiled computer program is run repeatedly as said computer program is run on said computing device. For instance, said part of said compiled computer program may be a function that is called at various instances as the compiled program is run on said computing device.

Said method may comprise the steps of determining a first runtime associated with a first run of said part of said compiled computer program, and determining a second runtime associated with a second run of said part of said compiled computer program.

This embodiment allows to collect statistics on specific functions or subroutines.

In an embodiment, the user may select said part of said compiled computer program as a part for which runtime information is desired, and the method may comprise the insertion of pairs of watchpoints in conjunction with the plurality of runs of said part of said compiled computer program, so as to acquire statistics on said runtime of said part of said compiled computer program.

In a preferred embodiment, the method further comprises a step of determining an average runtime by averaging over said first runtime and said second runtime.

In an industrial control environment, a compiled computer program may typically comprise a plurality of code cycles, which are often short, but repeated a large number of times. For instance, one particular code cycle may be associated with a given manufacturing step, and the compiled computer program is run again and again as that manufacturing step is repeated consecutively.

The presence of short iterative code cycles allows to measure the runtime of different parts of said compiled computer program in different code cycles. In any given code cycle, only a single part of said compiled computer program, or a limited number of different parts of said compiled computer program, may be analyzed, and hence the overall effect on the runtime can be kept small. However, over a plurality of code cycles, runtime information for all desired parts of said compiled computer program, such as all desired functions, may be acquired.

In a preferred embodiment, running said compiled computer program hence comprises running a plurality of code cycles of said compiled computer program, and determining a first runtime of a first part of said compiled computer program in a first subset of said plurality of code cycles, and determining a second runtime of a second part of said compiled computer program in a second subset of said plurality of code cycles.

Said second subset of said plurality of code cycles may be different from said first subset of code cycles.

Said first subset of said plurality of code cycles may comprise one code cycle of said compiled computer program, or a plurality of code cycles.

Similarly, said second subset of said plurality of code cycles may comprise one cycle of said compiled computer program, or a plurality of code cycles.

Said second part of said compiled computer program may be different from said first part of said compiled computer program.

Said first part and said second part may be first and second functions, respectively.

The invention also relates to a system for measuring a runtime in a compiled computer program, comprising a computing device adapted to run a compiled computer program with at least a first watchpoint and a second watchpoint at respective first and second code locations, a timer unit adapted to measure a first time parameter at said first watchpoint and a second time parameter at said second watchpoint, and an analyzer unit adapted to determine a runtime of at least a part of said compiled computer program in terms of said second time parameter and said first time parameter.

Said analyzer unit may be adapted to insert said first watchpoint and/or said second watchpoint into said compiled computer program at said first and second code locations, respectively.

In a preferred embodiment, said analyzer unit is adapted to vary said first code location and/or said second code location.

In particular, said computing device may be a programmable logic controller unit, or part of a programmable logic controller unit.

Said system may further comprise a selection unit adapted to select said part of said compiled computer program, wherein said analyzer unit may be adapted to insert said first watchpoint into said compiled computer program at a starting point of said part of said compiled computer program, and to insert said second watchpoint into said compiled computer program at an endpoint of said part of said compiled computer program.

Said system, in particular said analyzer unit, may be further adapted to implement a method with some or all of the features described above.

The invention further relates to a computer program or a computer program product comprising computer-readable instructions, wherein said instructions, when run on a computer, in particular on a system with some or all of the features described above, implement on said computer, in particular on said system, a method with some or all of the features described above.

DESCRIPTION OF PREFERRED EMBODIMENTS

The features and numerous advantages of the method and system according to the present invention will best be appreciated from a detailed discussion of specific embodiments with reference to the accompanying drawings, in which.

Embodiments of a method and system for measuring a runtime in a compiled computer program will now be described with reference to applications in an industrial control environment, in particular for measuring a runtime in a compiled industrial control program running on an industrial programmable logic controller that may be employed to control an industrial or automation process, such as manufacturing machinery or an industrial robot. However, these are mere examples, and one skilled in the art will understand that the invention is not so limited and may be employed in a variety of contexts in which the user may want to determine a runtime of a compiled piece of computer program code.

Figure 1:
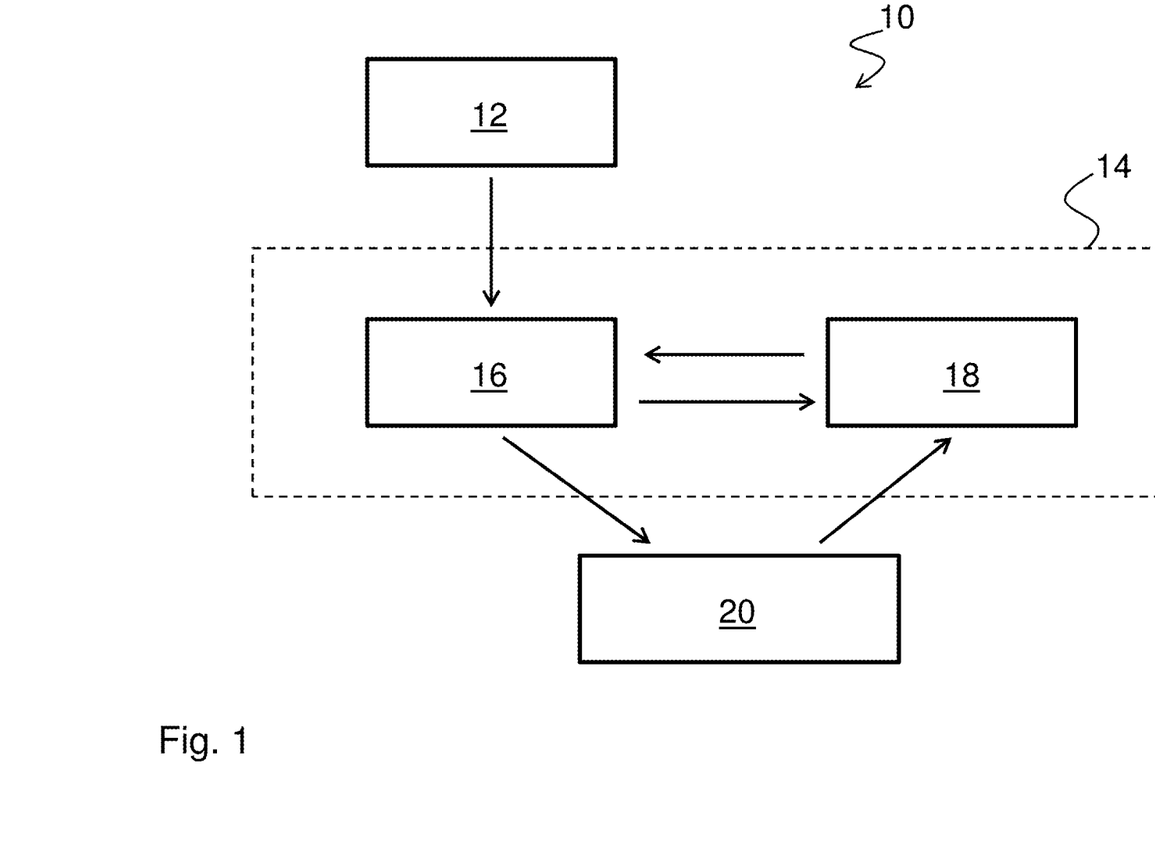
FIG. 1 is a schematic illustration of an industrial control environment in which a method and system according to an embodiment of the present invention may be implemented.

FIG. 1 is a schematic view of an industrial control environment 10 that comprises a programming environment 12, a controller system 14 with a programmable logic controller unit 16 and a monitoring unit 18, and an industrial controller application 20, such as an industrial robot.

The programming environment 12 provides the software tools that allow a user to program an industrial control program tailored for controlling the industrial control application 20. The programming environment 12 may also be employed to convert the high-level code into compiled code, which may be adapted to the programmable logic controller unit 16. The programming environment 12 then sends the compiled code to the programmable logic controller unit 16 by means of a data connection, such as a cable connection or a wireless connection.

The programmable logic controller logic 16 may store the compiled computer program code in a memory and may execute the compiled computer program code to control the industrial control application via a data connection, such as a data bus connection.

In many industrial control applications, the compiled computer program code is repeatedly executed in a large number of cycles, wherein each cycle corresponds to a given functionality in an industrial control application 20, such as the movement of a tool from a first position to a second position, or the measurement of a process parameter, such as temperature or pressure. Typical cycle times may be in the range from 0.1 to 100 ms.

The monitoring unit 18 may serve for monitoring both the industrial control application 20 and the programmable logic controller unit 16. For instance, the monitoring unit 18 may receive process parameters from the industrial control application 20 by means of a data connection. Depending on these process parameters, such as temperature or pressure readings from the machinery, the monitoring unit 18 may determine what amendments in the control program are appropriate or which subroutines or functions shall be called, and may cause the programmable logic controller unit 16 to run the control program accordingly. This may introduce a feedback path.

The monitoring unit 18 may also monitor the execution of the compiled computer program code on the programmable logic controller unit 16. For instance, the monitoring unit 18 may determine runtimes associated with specific functions or subroutines executed in the programmable logic controller unit 16, so as to provide feedback for the program developer and to assist the program developer to reduce or optimize the runtime.

In many industrial control applications, the runtime of the functions of the industrial control program is a key factor that may have a significant impact on the speed and efficiency with which the industrial control application 20 works. A reliable assessment of the efficiency of the industrial control hence often requires runtime measurements in real-time and in the real industrial control environment 10. However, these runtime measurements should not negatively impact on the industrial control process, and in particular should not significantly increase the total runtime of the industrial control program. Oftentimes, safety considerations or machinery specifications place tight bounds on the increase in runtime that may be tolerated in a live industrial control environment 10.

The inventors found that these conflicting challenges may be addressed by employing watchpoints in the compiled computer program code to trigger the runtime measurements, as will now be described in further detail with reference to FIGS. 2 and 3.

Figure 2:
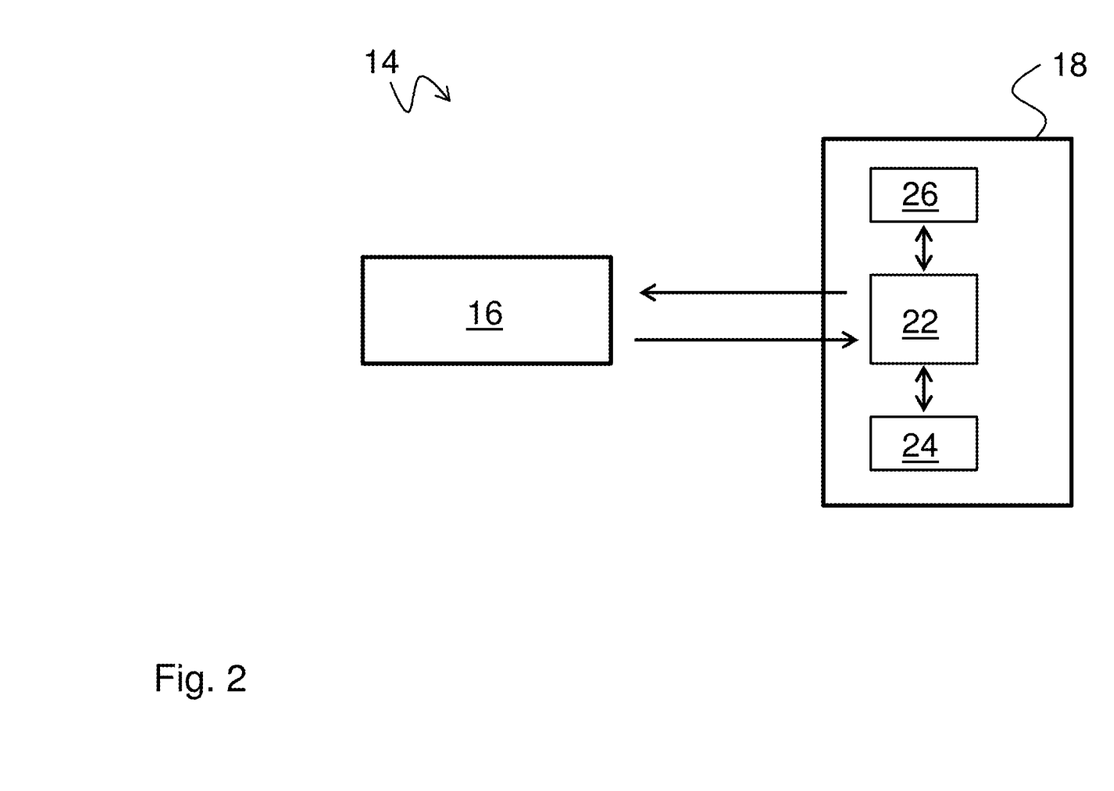
FIG. 2 is a detail view of FIG. 1 and illustrates a system for measuring a runtime in a compiled computer program according to an embodiment of the invention.

FIG. 2 is a close-up view of a controller system 14 according to an embodiment of the invention. As can be taken from FIG. 2, the monitoring unit 18 comprises an analyzer unit 22 that is connected to a timer unit 24 providing a clock signal and to a selection unit 26. In FIG. 2, the analyzer unit 22, timer unit 24 and selection unit 26 may be integrated into a conventional monitoring unit 18. However, this is merely an example, and the units 22, 24, and 26 may just as well be provided as separate and independent components, depending on the application.

The analyzer unit 22 may be adapted to insert watchpoints at various locations into the compiled computer program code stored and executed on the programmable logic controller unit 16. The code locations at which the watchpoints are inserted may be variable, and may be determined in accordance with given user instructions. For instance, a user may select a specific function or a subroutine for which he would like to obtain runtime measurements. This selection may be made by means of the selection unit 26, which may allow a user to choose from a list of functions or subroutines that are executed in the compiled industrial control program. Different techniques for selecting these functions and for displaying the measurement results by means of the selection unit 26 will later be described with reference to FIGS. 6 and 7.

Once the function has been selected by means of the selection unit 26, the analyzer unit 22 may insert corresponding watchpoints into the compiled computer program code at code locations that may correspond to a start point and an end point of said function. As the compiled computer program is run on the programmable logic control unit 16 and the respective watchpoints are reached in the program code, the watchpoints trigger the measurement of time parameters by means of the timer unit 24.

Assuming that a first watchpoint at a first code location corresponding to a starting point or call of the function triggers the measurement of a first time parameter $t_1$ by means of the timer unit 24, and a second watchpoint located at a second code location associated with an end point or exit of the function triggers the measurement of a second time parameter $t_2$ by means of the timer unit 24, a runtime of the function may be determined as a difference $t_2-t_1$ of the second time parameter $t_2$ and the first time parameter $t_1$.

In case one and the same function is called several times in the compiled computer program, a plurality of time differences pertaining to said function may be collected by inserting pairs of watchpoints at the respective starting points and end points, and allow to acquire statistics on the runtime of that particular function.

The runtime of different functions may be measured in different cycles of the program code, so as to reduce the overall effect of the runtime measurements on the total runtime.

Figure 3:
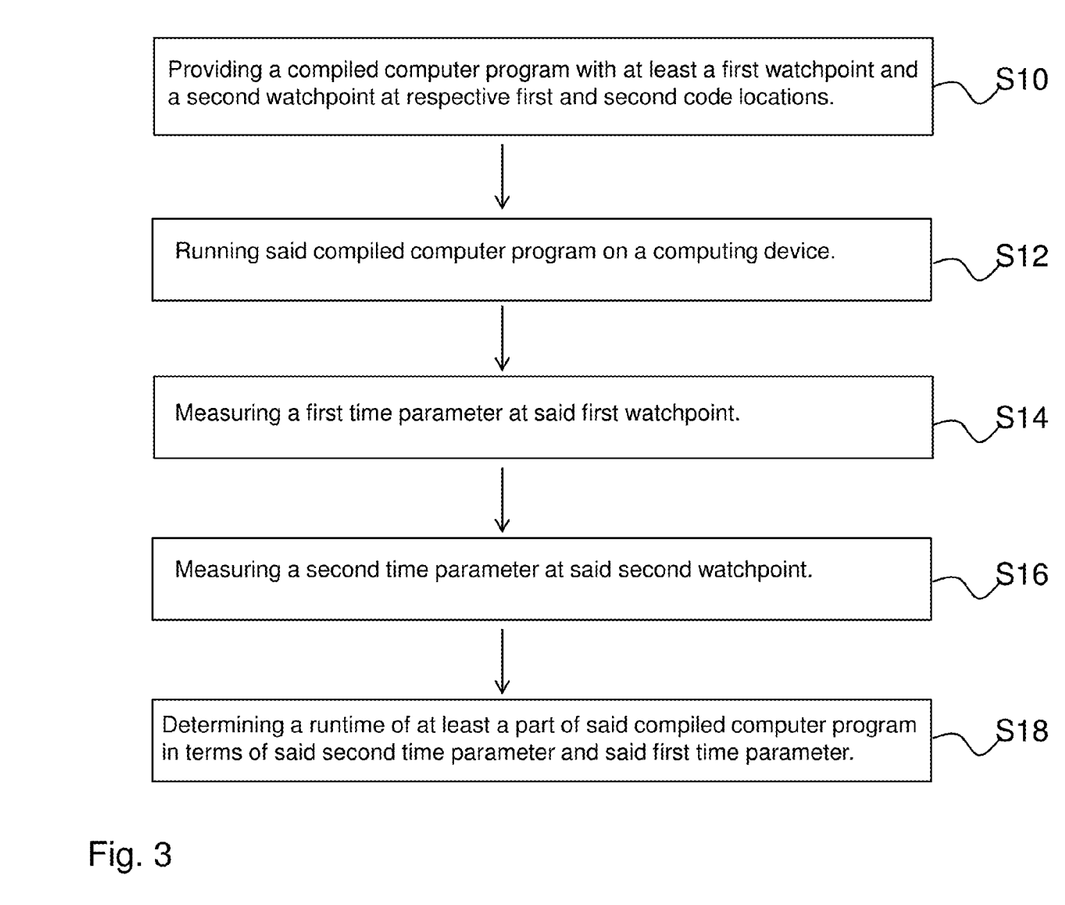
FIG. 3 is a flow diagram illustrating method steps for measuring a runtime in a compiled computer program according to an embodiment of the invention.

The flow diagram of FIG. 3 summarizes the steps of a method for measuring a runtime in a compiled computer program according to an embodiment of the invention.

In a first step S10, a compiled computer program, such as an industrial control program stored and executed in the programmable logic controller unit 16, is provided with at least a first watchpoint and a second watchpoint at respective first and second code locations.

In a second step S12, the compiled computer program comprising the first and second watchpoints is run or executed on a computing device, such as on the programmable logic controller unit 16.

In a third step S14, a first time parameter is measured at the first watchpoint, such as by means of the timer unit 24.

In a subsequent fourth step S16, a second time parameter is measured at the second watchpoint, such as by means of the timer unit 24.

As described in greater detail with reference to FIG. 2 above, the first code location pertaining to the first watchpoint may be selected by means of the selection unit 26 as the start point of the function of the compiled computer program, and the second code location pertaining to the second watchpoint may be selected by means of the selection unit 26 as an end point of the function.

In a subsequent step S18, a runtime of at least a part of said compiled computer program, such as the function, is determined in terms of the second time parameter and the first time parameter, for example as the difference between the second time parameter and the first time parameter.

There are several techniques how watchpoints may be inserted into the compiled computer program code in the context of the present invention.

Watchpoints, in the sense of the invention, may be understood as a particular type of breakpoint in which the execution of the code is not merely paused. Rather, a watchpoint may trigger the execution or call of subroutines or functions. Conventionally, watchpoints may be employed to read out and store parameter values, for logging of data or even to trigger the execution of external code portions. In the context of the present invention, the watchpoints may trigger time measurements by means of the timer unit 24.

Watchpoints may be implemented in software, such as by code manipulation or patching. The patch may comprise an assembler code piece substituted for the original industrial control program code at the location of the watchpoint. For instance, the patched assembler code may trigger the execution of a debugger routine. In general, the trigger may comprise a jump, a call, or a software interrupt.

As an illustrating toy example, consider the following piece of code:

x:=x+1;

On an x86 platform, this piece of code may be translated into the following binary code chain:

| | | |
|---|---|---|
| 040C213E 0F BF 05 00 0F 0C 04 | movsx | eax,word ptr ds:[40C0F00h] |
| 040C214S 83 C0 01 | add | eax,1 |
| 040C2148 66 A3 00 0F 0C 04 | mov | word ptr ds:[040C0F00h],ax |

In this case, the address of the integer variable x is 0x40C0F00. If a breakpoint is inserted into this code line, a call for a specific debugging routine is patched in the generated code:

| | | |
|---|---|---|
| 040C213E E8 E8 27 02 FD | call | @ILT+14630(__syscpudebughandler) (10E492Bh) |
| 040C2143 0C 04 | or | al,4 |
| 040C2145 83 C0 01 | add | eax,1 |
| 040C2148 66 A3 00 0F 0C 04 | mov | word ptr ds:[040C0F00h],ax |

As can be taken from this code portion, the call has less bytes than the original assembler directive over which the call was patched. Two bytes that were originally part of the address of x remain, and are interpreted by the disassembler in this case as "or al. 4".

Once the execution of the program proceeds to this assembler directive, a jump into the function syscpudebughandler is executed. This function may be implemented to perform the time measurement of time parameters $t_1$ and $t_2$, as described above with reference to FIGS. 2 and 3.

Once the time measurement has been completed, the execution may leave the function syscpudebughandler, and may revert to the original control program code.

For instance, the original control program code can be executed at a different location, and the execution can be continued at the next-following assembler directive, in this case at the address 0x40C2145. The register contents may need to be amended in the process.

Alternatively, the original code may be patched back to the watchpoint position. At the same time, another watchpoint may be set to the next-following address, in this case 0x40C2145. The execution then returns to the original code, executes the directive and branches into the debug function, where the original watchpoint will be set again. The watchpoint at the next-following position may now be deleted, and the execution returns to the next-following position.

On some processors or platforms, an implementation of the watchpoints in software may not be feasible or supported. For instance, on some processors the code may be executed in a flash memory, which cannot easily be manipulated.

However, most processors allow a hardware implementation of watchpoints. On an x86 platform, a watchpoint may be implemented by means of a debug register.

Four registers can be loaded with respective addresses, which, upon execution, may trigger an exception that branches off into a debugger routine.

The time measurement of a function by means of watchpoints according to an embodiment of the invention will now be described in additional detail with reference to FIG. 4.

In general, a function may be called a plurality of times in each cycle of the industrial control program, and may also call itself in a recursion. As described above with reference to FIGS. 2 and 3, respective watchpoints may be set both at a call of the function and at an exit of the function. At each watchpoint, the timer unit 24 may collect the current time, such as system time, and may further collect whether a call or exit took place, for instance as a Boolean value. Based on these parameters, the analyzer unit 22 may determine the number of calls and the runtime associated with each call.

Figure 4:
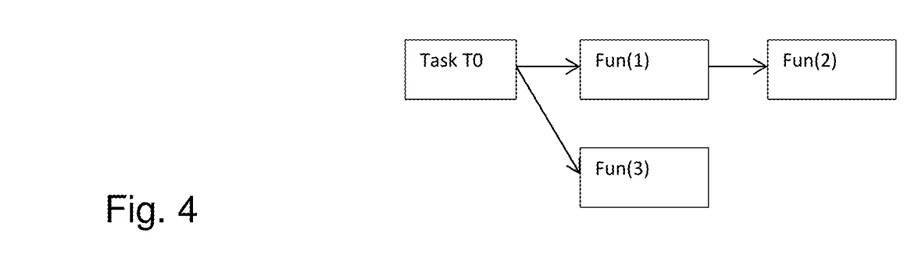
FIG. 4 schematically illustrates a method for measuring a runtime of a single function according to an embodiment of the invention.

FIG. 4 shows an example of a task T0 that comprises a function Fun that may be called a plurality of times, and whose runtime shall be determined. In the example of FIG. 4, Fun is called three times in the cycle. The timer unit 24 hence compiles the following sequence of measurements at the respective watchpoints:

Time1 In
Time2 In
Time3 Out
Time4 Out
Time5 In
Time6 Out

In such a sequence of measurements, the number of calls (in measurements) and the number of exits (out measurements) are generally identical. Moreover, when viewed in sequence, the number of calls (in measurements) is generally not smaller than the number of exits (out measurements).

In order to evaluate the sequence of measurements, one may proceed consecutively from the beginning to the end, and may associate to each out measurement the immediately preceding in measurement. The difference of both time parameters corresponds to the runtime of a function call. Those measurements may then be removed from the list. This allows to determine the runtime for each individual call of the function. Statistics may be employed to determine the average runtime, maximum runtime, minimum runtime, etc.

Figure 5:
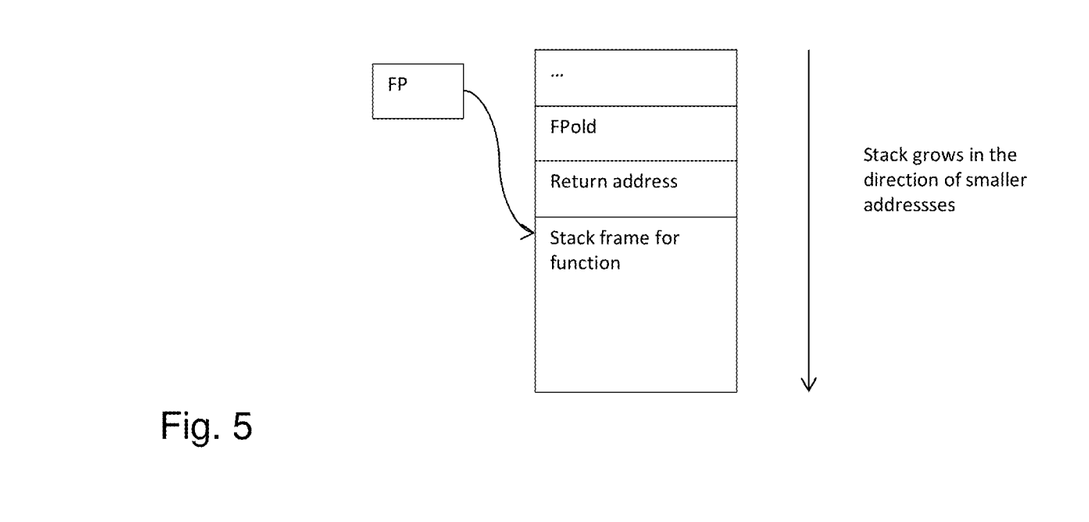
FIG. 5 illustrates how a call stack for a given function may be determined according to an embodiment of the invention.

In order to associate a call location in the source code to the runtime measurement, one may determine a corresponding call stack at each call of the function, as will now be described with reference to FIG. 5.

A call stack generally comprises the inputs, outputs, return values, local variables and intermediate results of a function. A corresponding piece of memory stack pertaining to the function is usually called a stack frame. A reserved register, the frame pointer (FP), points to the beginning of said stack frame, as shown in FIG. 5. When a function is called, the frame pointer and the return address are moved to the stack. Subsequently, a new frame for the function is generated. Hence, the frame pointer points to the beginning of the frame for the function. On the other hand, the return address of the function call as well as the preceding frame pointer (FPold) can be found at a fixed offset position with respect to the current frame pointer.

The return address allows to determine the calling function, and the former frame pointer yields the stack frame of the calling function. This allows to trace back the list of calls, and hence allows to locate the position in the source code from which the call of the given task or function was made.

Figure 6:
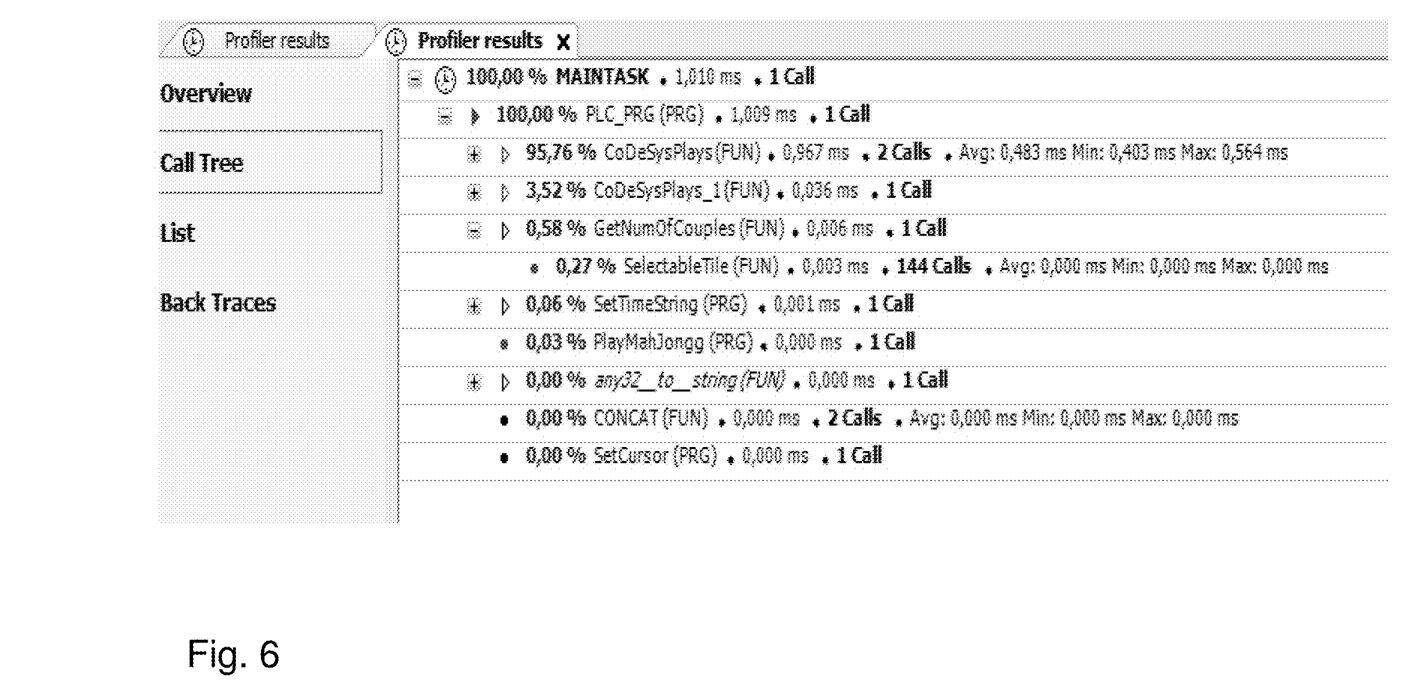
FIG. 6 is a schematic view of a user interface showing a statistical call tree that may be employed for measuring a runtime in a compiled computer program according to an embodiment of the invention.

FIG. 6 shows an example of a front end that may be displayed on a graphical user interface provided at the selection unit 26. The front end may be interactive in that it displays the obtained measurement results and at the same time allows the user to manage the measurements. For instance, the user may select additional functions for which runtime information is desired, or select the location of watchpoints in the compiled computer program code.

FIG. 6 depicts a statistical call tree in which the call tree of functions is displayed based on a given task entry function.

Initially, all the tasks that belong to the current application are displayed. Runtime measurements may be made in the visible part of the tree. Once a subtree is opened, watchpoints may automatically be inserted into the compiled computer program code at the entry point and exit point of all newly displayed functions. These watchpoints may remain active for one cycle, and hence a runtime of these functions may be measured within this cycle. After the cycle, the watchpoints may be canceled.

A stack of values is associated with each pair of entry/exit watchpoints. The depth of the stack depends on the number of occurrences of the function in the statistical call tree. Upon entry into a function, the corresponding time parameter may be moved to the stack, and the call list is determined at the current position, as described with reference to FIG. 5 above. Upon exit from the function, the uppermost stack entry is removed from the stack, and may be subtracted from the current time. One single call of the function hence yields the measured runtime and the corresponding stack. One and the same function may be called several times, resulting in a list of call stacks with the corresponding runtimes. For instance, FIG. 6 shows two calls for some of the functions, together with the average, minimum and maximum runtimes.

The user may access specific functions in the front end of FIG. 6, such as by clicking on that function, and may provide instructions to repeat a measurement for a specific function or subtree.

Figure 7:
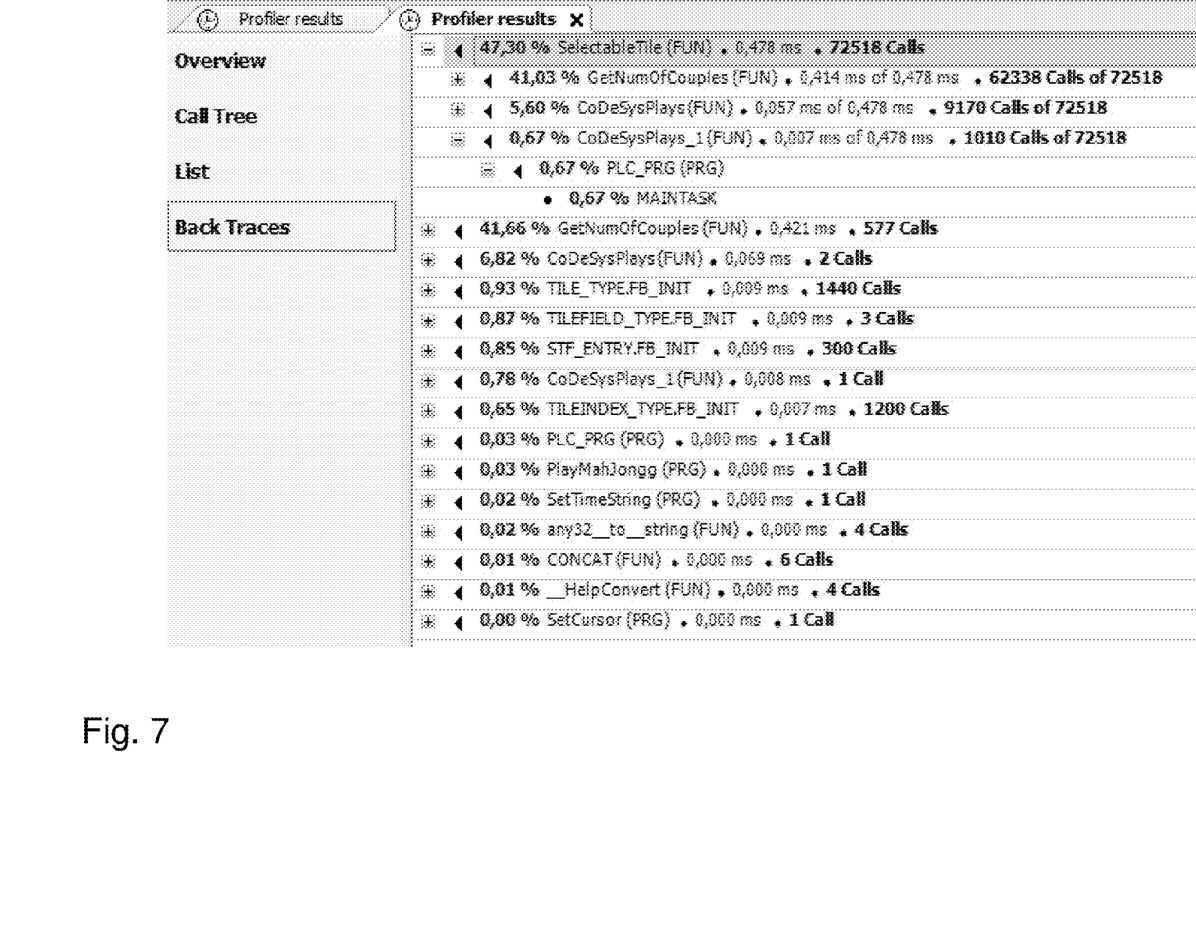
FIG. 7 is an alternative user interface that allows backtracing.

An alternative ("back-tracing") mode of displaying the measurement results is shown in FIG. 7. The measurement results generally correspond to those of the statistical call tree shown in FIG. 6. However, in the back-tracing mode, starting from a given function a tree of all callers of the function is displayed. Similarly to the statistical call tree described with reference to FIG. 6, runtime measurements may be initiated for all newly-displayed functions.

The description of the preferred embodiments and the Figures merely serve to illustrate the invention and some of the advantageous effects that the invention achieves, but should not be understood to imply any limitation. The scope of the invention is to be determined solely by means of the appended claims.

REFERENCE SIGNS 10 industrial control environment
12 programming environment
14 controller system
16 programmable logic controller unit
18 monitoring unit
20 industrial control application
22 analyzer unit
24 timer unit
26 selection unit

What is claimed is:

1. A computer-implemented method for measuring a runtime in a compiled computer program comprising:
   providing a compiled computer program with at least a first watchpoint and a second watchpoint at respective first and second code locations, wherein said first and second watchpoints are patched into said compiled computer program as portions of compiled computer program code that is substituted for original code at the respective first and second code locations;
   running said compiled computer program on a computing device;
   measuring a first time parameter ($t_1$) at said first watchpoint;
   measuring a second time parameter ($t_2$) at said second watchpoint; and
   determining a runtime of at least a part of said compiled computer program in terms of a time difference between said second time parameter ($t_2$) and said first time parameter ($t_1$) without pausing execution of said compiled computer program.

2. The method according to claim 1, further comprising a step of inserting said first watchpoint and/or said second watchpoint into said compiled computer program at said first and second code locations.

3. The method according to claim 1, further comprising a step of varying said first code location and/or varying said second code location in accordance with a selected part of said compiled computer program.

4. The method according to claim 1, wherein said part of said compiled computer program is a function, and running said compiled computer program preferably comprises a step of calling said function.

5. The method according to claim 1, wherein said first code location is associated with a call of a function as said compiled computer program is run on said computing device, and/or said second code location is associated with an exit from said function.

6. The method according to claim 1, wherein said portions of compiled computer program code comprise assembly code.

7. The method according to claim 1, wherein said first watchpoint and/or said second watchpoint are implemented in hardware on a processor unit of said computing device,
wherein said first watchpoint and/or said second watchpoint preferably are implemented in terms of an exception branching into a debugger routine.

8. The method according to claim 1, wherein said part of said compiled computer program is run repeatedly as said computer program is run on said computing device, and said method comprises the steps of determining a first runtime associated with a first run of said part of said compiled computer program and determining a second runtime associated with a second run of said part of said compiled computer program.

9. The method according to claim 1, wherein running said compiled computer program comprises running a plurality of code cycles of said compiled computer program, and determining a first runtime of a first part of said compiled computer program in a first subset of said plurality of code cycles, and determining a second runtime of a second part of said compiled computer program in a second subset of said plurality of code cycles different from said first subset of code cycles.

10. A computer system for measuring a runtime in a compiled computer program, comprising:
   a computing device adapted to run a compiled computer program with at least a first watchpoint and a second watchpoint at respective first and second code locations, wherein said first and second watchpoints are patched into said compiled computer program as portions of compiled computer program code that is substituted for original code at the respective first and second code locations;
   a timer unit adapted to measure a first time parameter ($t_1$) at said first watchpoint and a second time parameter ($t_2$) at said second watchpoint; and
   an analyzer unit adapted to determine a runtime of at least a part of said compiled computer program in terms of a time difference between said second time parameter ($t_2$) and said first time parameter ($t_1$) without pausing execution of said compiled computer program.

11. The system according to claim 10, wherein said analyzer unit is further adapted to insert said first watchpoint and/or said second watchpoint into said compiled computer program at said first and second code locations, respectively.

12. The system according to claim 10, wherein said analyzer unit is adapted to vary said first code location and/or said second code location.

13. The system according to claim 10, wherein said computing device is a programmable logic controller unit, or part of a programmable logic controller unit.

14. The system according to claim 10, further comprising a selection unit adapted to select said part of said compiled computer program, wherein said analyzer unit is adapted to insert said first watchpoint into said compiled computer program at a starting point of said part of said compiled computer program, and to insert said second watchpoint into said compiled computer program at an end point of said part of said compiled computer program.

15. A non-transitory computer-readable storage medium having a plurality of instructions encoded thereon that when executed by at least one processer cause a process to be carried out, the process comprising:
   inserting at least a first watchpoint and a second watchpoint at respective first and second code locations within a compiled computer program, wherein said first and second watchpoints are patched into said compiled computer program as portions of compiled computer program code that is substituted for original code at the respective first and second code locations;

running said compiled computer program on a computing device;

measuring a first time parameter ($t_1$) at said first watchpoint;

measuring a second time parameter ($t_2$) at said second watchpoint; and determining a runtime of at least a part of said compiled computer program in terms of a time difference between said second time parameter ($t_2$) and said first time parameter ($t_1$) without pausing execution of said compiled computer program.

\* \* \* \* \*